(12) United States Patent
Nakamura et al.

(10) Patent No.: US 12,459,232 B2
(45) Date of Patent: Nov. 4, 2025

(54) LAMINATED STEEL SHEET FOR BOTH-SIDED RESIN-COATED CONTAINER

(71) Applicant: JFE STEEL CORPORATION, Tokyo (JP)

(72) Inventors: Norihiko Nakamura, Tokyo (JP); Yasuhide Oshima, Tokyo (JP); Junichi Kitagawa, Tokyo (JP); Hiroki Nakamaru, Tokyo (JP); Yoichiro Yamanaka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1348 days.

(21) Appl. No.: 15/781,605

(22) PCT Filed: Oct. 21, 2016

(86) PCT No.: PCT/JP2016/081294
§ 371 (c)(1),
(2) Date: Jun. 5, 2018

(87) PCT Pub. No.: WO2017/098818
PCT Pub. Date: Jun. 15, 2017

(65) Prior Publication Data
US 2020/0262183 A1    Aug. 20, 2020

(30) Foreign Application Priority Data
Dec. 9, 2015  (JP) .................. 2015-240141

(51) Int. Cl.
*B32B 15/09* (2006.01)
*B32B 15/18* (2006.01)
*B65D 65/40* (2006.01)

(52) U.S. Cl.
CPC ............ *B32B 15/09* (2013.01); *B32B 15/18* (2013.01); *B65D 65/40* (2013.01);
(Continued)

(58) Field of Classification Search
CPC ..... Y10T 428/12493; Y10T 428/12535; Y10T 428/12542; Y10T 428/12549;
(Continued)

(56) References Cited

U.S. PATENT DOCUMENTS 8,828,512 B2    9/2014  Oshima et al.
2006/0228524 A1  10/2006  Kubo et al.
(Continued)

FOREIGN PATENT DOCUMENTS

CN    101939163 A    1/2011
CN    103608491 A    2/2014
(Continued)

OTHER PUBLICATIONS

Canadian Office Action for Canadian Application No. 3,006,490, dated Jun. 3, 2019, 3 pages.
(Continued)

*Primary Examiner* — Maria V Ewald
*Assistant Examiner* — Ethan A. Utt
(74) *Attorney, Agent, or Firm* — Buchanan Ingersoll & Rooney PC

(57) ABSTRACT

A laminated steel sheet for a both-sided resin-coated container includes a steel sheet, a first polyester resin layer formed on a surface of the steel sheet serving as an inner side of a container after the container is formed, and a second polyester resin layer formed on a surface of the steel sheet serving as an outer side of the container after the container is formed. The first polyester resin layer includes a polyethylene terephthalate content of 95% by weight or more and has a degree of crystallinity in a range of 3% to 25%. The second polyester resin layer includes polyethylene terephthalate and polybutylene terephthalate and has a proportion of polybutylene terephthalate in a range of 40% by weight to 80% by weight.

2 Claims, 1 Drawing Sheet

(52) U.S. Cl.
CPC ....... *B32B 2250/04* (2013.01); *B32B 2255/06* (2013.01); *B32B 2255/26* (2013.01); *B32B 2307/704* (2013.01); *B32B 2439/00* (2013.01)

(58) Field of Classification Search
CPC ..... Y10T 428/12556; Y10T 428/12569; Y10T 428/12771; Y10T 428/12861; Y10T 428/12951; Y10T 428/12958; Y10T 428/12965; Y10T 428/12972; Y10T 428/12979; Y10T 428/31678; Y10T 428/31681; Y10T 428/31786; B32B 15/00; B32B 15/04; B32B 15/08; B32B 15/09; B32B 15/18; B32B 27/00; B32B 27/06; B32B 27/08; B32B 27/36; B32B 2439/00; B32B 2439/40; B32B 2439/66; B32B 2439/70; B65D 1/00; B65D 1/12; B65D 1/40; B65D 1/42; B65D 1/48; B65D 7/00; B65D 7/02; B65D 7/04; B65D 7/12; B65D 7/42; B65D 11/00; B65D 11/02; B65D 11/20; B65D 15/00; B65D 15/02; B65D 15/10; B65D 15/16; B65D 23/00; B65D 23/02; B65D 23/08; B65D 23/0814; B65D 23/0821; B65D 25/00; B65D 25/14; B65D 25/34; B65D 25/36
USPC ...... 215/12.1, 12.2; 220/62.11–62.14, 62.22; 428/615, 621–624, 626, 655, 668, 428/681–685, 457, 458, 480
See application file for complete search history.

(56) References Cited

U.S. PATENT DOCUMENTS

| | | | |
|---|---|---|---|
| 2010/0310824 A1* | 12/2010 | Oshima | B32B 15/09 428/141 |
| 2014/0162055 A1* | 6/2014 | Kitagawa | B32B 15/09 428/458 |
| 2014/0339123 A1 | 11/2014 | Nakagawa et al. | |
| 2015/0122812 A1 | 5/2015 | Nakagawa et al. | |
| 2015/0129453 A1 | 5/2015 | Uchikawa et al. | |
| 2016/0009444 A1 | 1/2016 | Nakagawa et al. | |

FOREIGN PATENT DOCUMENTS

| | | | |
|---|---|---|---|
| JP | 05331302 | A | 12/1993 |
| JP | 06155660 | A | 6/1994 |
| JP | 07145252 | A | 6/1995 |
| JP | 09012743 | A | 1/1997 |
| JP | 10110046 | A | 4/1998 |
| JP | 2000313755 | A | 11/2000 |
| JP | 2001001446 | A | 1/2001 |
| JP | 2001262370 | A | 9/2001 |
| JP | 2001335682 | A | 12/2001 |
| JP | 2001353812 | A | 12/2001 |
| JP | 2002331629 | A | 11/2002 |
| JP | 2003025498 | A | 1/2003 |
| JP | 2003025500 | A | 1/2003 |
| JP | 2004168365 | A | 6/2004 |
| JP | 2004237549 | A | 8/2004 |
| JP | 2005342911 | A | 12/2005 |
| JP | 2006205575 | A | 8/2006 |
| JP | 2009184262 | A | 8/2009 |
| JP | 2014166856 | A | 9/2014 |
| KR | 20140135221 | A | 11/2014 |

OTHER PUBLICATIONS

Japanese Office Action for Japanese Application No. 2017-536031, dated Aug. 28, 2018, with Concise Statement of Relevance of Office Action, 4 pages.
International Search Report and Written Opinion for International Application No. PCT/JP2016/081294, dated Jan. 24, 2017—6 pages.
Taiwan Office Action for Taiwan Application No. 105140090 with English search report dated Jun. 17, 2017, 5 pages.
Australian Examination Report for Australian Application No. 2016367903, dated Oct. 17, 2018, 3 pages.
Extended European Search Report for European Application No. 16872718.8, dated Nov. 15, 2018, 6 pages.
Japanese Office Action for Japanese Application No. 2017-536031, dated Nov. 13, 2018 with Concise Statement of Relevance of Office Action, 5 pages.
Korean Office Action for Korean Application No. 10-2018-7014955, dated Jun. 27, 2019 with Concise Statement of Relevance of Office Action, 5 pages.
Chinese Office Action with Search Report for Chinese Application No. 201680071293.X, dated Jul. 5, 2019, 8 pages.
European Communication pursuant to Article 94(3) for European Application No. 16 872 718.8, dated Feb. 19, 2021, 5 pages.

* cited by examiner

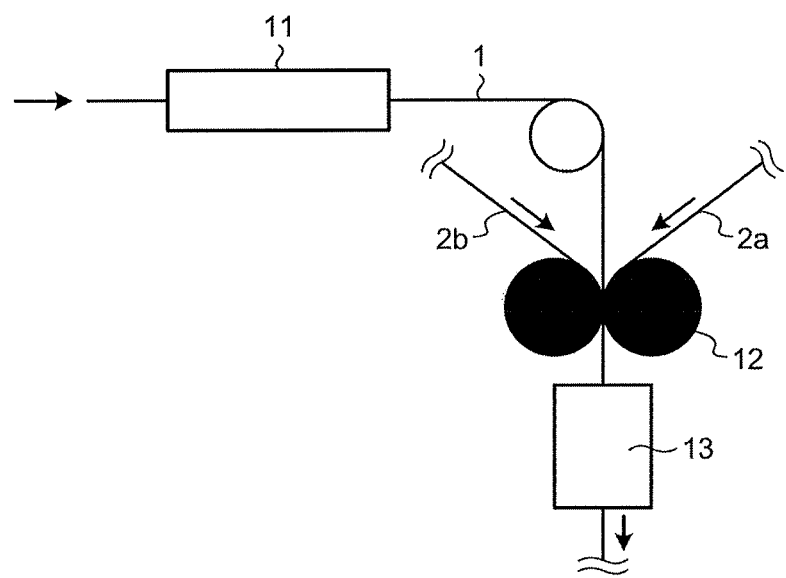

LAMINATED STEEL SHEET FOR BOTH-SIDED RESIN-COATED CONTAINER

CROSS REFERENCE TO RELATED APPLICATIONS

This is the U.S. National Phase application of PCT/JP2016/081294, filed Oct. 21, 2016, which claims priority to Japanese Patent Application No. 2015-240141, filed Dec. 9, 2015, the disclosures of these applications being incorporated herein by reference in their entireties for all purposes.

TECHNICAL FIELD OF THE INVENTION

The present invention relates to a laminated steel sheet for a both-sided resin-coated container mainly used for canning containers for food.

BACKGROUND OF THE INVENTION

Solvent-based paints with a thermosetting resin as a main component have been conventionally applied to an inner side and an outer side of metallic beverage cans and canning containers for food. The application of solvent-based paints is for the purpose of maintaining the flavor of contents, preventing metal as a material of beverage cans and canning containers for food from being corroded, improving the visual quality of the outer side and protecting a printed face of beverage cans and canning containers for food, and the like. However, the application of solvent-based paints requires heating treatment at high temperatures in order to form coatings and produces a large amount of solvents during heating, giving rise to problems in terms of safety at work and influence on the environment. Given these circumstances, metal coating techniques with thermoplastic resins have been recently developed as methods for preventing corrosion without using any solvent-based paint. Polyester resins, in particular, among thermoplastic resins have improved formability and heat resistance, and polyester resin-based films for coating metal are being developed.

When the inner and outer sides of a container are coated with the thermoplastic resin as described above, the inner side and the outer side are different from each other in required characteristics, and different thermoplastic resins are required to be appropriately used. In view of manufacture, when the respective melting points of the thermoplastic resins used for the inner and outer sides are different from each other, attention should be given not to cause a thermoplastic resin on the lower melting point side to melt and adhere to rolls and the like. In other words, in this case, lamination at a high temperature is required in order to ensure adhesiveness between a film on the higher melting point side and a steel sheet; however, when a lamination condition adapted to the melting point of the film on the higher melting point side is set, not only an interfacial part with the steel sheet, but the whole of a film on the lower melting point side may melt, and a failure in which the film adheres (melts and sticks) to a roll for pressure sealing may occur. In view of performance, for the thermoplastic resin used for the inner side of the container, corrosion resistance to contents (contents resistance) and adhesiveness during long-term contact with contents are required. The thermoplastic resin used for the outer side of the container involves problems in that a cyclic trimer within the thermoplastic resin is precipitated on the surface of the resin during high-temperature sterilization treatment such as retort sterilization treatment to impair visual quality and that a phenomenon in which the thermoplastic resin itself changes color to be turbid (a whitening phenomenon) during the retort sterilization treatment occurs.

Patent Literature 1 describes as a method for solving these problems a metal sheet in which the outer side of the container is coated with a resin film that is a polyester resin blending a polyester with ethylene terephthalate as a main repeating unit in a proportion of 30 o 50% by mass and a polyester with butylene terephthalate as a main repeating unit in a proportion of 50 to 70% by mass. With this metal sheet, a shortest semi-crystallization time is set to 100 seconds or less to crystallize the resin film using the heat of the retort sterilization treatment, and a crystallization rate is increased, whereby white spots (whitening) can be prevented from occurring in the resin film.

Patent Literature also states that this metal sheet has a polyester resin layer with a double-layer structure on the inner side of the container in which a polyester resin layer as an upper layer is polyethylene terephthalate or a copolymerized polyethylene terephthalate with isophthalic acid as an acid component compolymerized in a proportion of 6 mol % or less. Also stated is that the polyester resin layer as the upper layer contains 0.1 to 5% by mass of an olefin-bases wax, whereas a polyester resin layer as a lower layer is a copolymerized polyethylene terephthalate with isophthalic acid as an acid component compolymerized in a proportion of 10 to 22 mol % or less. Similarly, Patent Literature 2 to 5 describe techniques that improve the whitening resistance of the resin film on the outer side of the container.

Patent Literature 6 discloses a polyester composition containing 30 to 50% by mass of a polyester with ethylene terephthalate as a main repeating unit and 50 to 70% by mass of a polyester with butylene terephthalate as a main repeating unit. With this polyester composition, the color change during the retort sterilization treatment can be inhibited. Patent Literature 6 also describes a technique that melts an interface between the resin film and the metal sheet when the melting point of the resin film is determined, and the resin film is heat-sealed. Patent Literature 7 and Patent Literature 8 describe techniques that inhibit the color change during the retort sterilization treatment.

Patent Literature 9 and 10 disclose steel sheets in which different films are laminated on a can inner side and a can outer side. Furthermore, Patent Literature 9 describes a technique that uses a polyester film with a contact angle of 70 o 120 degrees on the inner side of the container and laminates polyethylene terephthalate-polybutylene terephthalate (PET-PBT) with a crystallization temperature of 120° C. or less on the outer side of the container to improve whitening resistance. Patent Literature 10 discloses a technique that laminates PET-PBT on the can outer side and laminates a copolymerized PET on the can inner side.

CITATION LIST

Patent Literature

Patent Literature 1: Japanese Patent Application Laid-open No. 2005-342911
Patent Literature 2: Japanese Patent Application Laid-open No. H05-331302
Patent Literature 3: Japanese Patent Application Laid-open No. 2000-313755
Patent Literature 4: Japanese Patent Application Laid-open No. 2001-335682
Patent Literature 5: Japanese Patent Application Laid-open No. H06-155660

Patent Literature 6: Japanese Patent Application Laid-open No. H10-110046

Patent Literature 7: Japanese Patent Application Laid-open No. H09-012743

Patent Literature 8: Japanese Patent Application Laid-open No. H07-145252

Patent Literature 9: Japanese Patent Application Laid-open No. 2004-168365

Patent Literature 10: Japanese Patent Application Laid-open No. 2014-166856

SUMMARY OF THE INVENTION

However, although the techniques described in Patent Literature 1 to 5 produce an effect of improving the whitening resistance of the resin film on the outer side of the container, the resin film on the inner side of the container contains the copolymerized resin, and a copolymerized component may be eluted to be inferior in contents resistance. In addition, the melting points of the resin films on the inner side and the outer side are comparable to each other, which involves fewer manufacturing technical problems for laminating them, and thus no consideration to the crystallization behavior of the resin films is given.

The techniques described in Patent Literature 6 to 8, which require to heat-seal the resin films simultaneously to both sides of the steel sheet for use in the container, describe only the heat sealing of the resin film on one side and do not disclose nor suggest a technique for the heat sealing of the resin film on the opposite side. As described above, the inner side and the outer side of canning containers for food are different from each other in required performance, and different kinds of resin films are required to be combined with each other. Although different kinds of resin films are used, the resin films are preferably heat-sealed simultaneously considering productivity; although resin films having substantially comparable melting points by copolymerization have been combined with each other, a copolymerized component is required to be added, leading to an increase in cost. When the melting points of the resin films are considerably different from each other, to heat-seal the resin film on the higher melting point, the different kinds of resin films are required to be heated up to the higher melting point, in which the resin film on the lower melting point side, exceeding its melting point, may adhere to rolls and the like to hinder productivity. The techniques, which do not consider these viewpoints, are inferior in the adhesiveness of the resin films and may thus be lacking in competitiveness as products or be inferior in productivity.

The technique described in Patent Literature 9, in which the crystal structure of the resin films is not controlled, provides insufficient can formability, although it has improved whitening resistance. In addition, the resin film on the inner side is an isophthalic acid-based copolymerized PET, and a copolymerized component may be eluted to be inferior in contents resistance. Patent Literature 9 does not disclose nor suggest a method for simultaneously laminating different films for the outer side face and the inner side. Furthermore, the technique described in Patent Literature 10 adjusts a copolymerization proportion to make both the melting points of the films on the outer side and the inner side fall within the range of 220 to 256° C. and thus does not disclose nor suggest a method for simultaneously laminating the films on the outer side and the inner side having different melting points.

Aspects of the present invention have been made in order to solve the above problems, and an object thereof is to provide a laminated steel sheet for a both-sided resin-coated container that can be supplied stably without any problem in manufacture, and has an improved visual quality of appearance after retort sterilization treatment and improved contents resistance.

The inventors of the present invention have earnestly studied a combination of the resin films on the inner side and the outer side of containers and their crystallization behavior to find out that the above problems can be solved by controlling the crystallization behavior of the resin films on the inner side and the outer side of containers.

A laminated steel sheet for a both-sided resin-coated container according to aspects of the present invention invented in view of the above-described knowledge includes: a steel sheet; a first polyester resin layer formed on a surface of the steel sheet serving as an inner side of a container after the container is formed; and a second polyester resin layer formed on a surface of the steel sheet serving as an outer side of the container after the container is formed, wherein the first polyester resin layer includes a polyethylene terephthalate content of 95% by weight or more and has a degree of crystallinity in a range of 3% to 25%, and the second polyester resin layer includes polyethylene terephthalate and polybutylene terephthalate and has a proportion of polybutylene terephthalate in a range of 40% by mass to 80% by weight.

Moreover, in the above-described laminated steel sheet for a both-sided resin-coated container according to aspects of the present invention, a crystallization temperature of the second polyester resin layer is in a range of 60° C. to 72° C.

Aspects of the present invention can provide a laminated steel sheet for a both-sided resin-coated container that can be supplied stably without any problem in manufacture, and has an improved visual quality of appearance after retort sterilization treatment and improved contents resistance.

BRIEF DESCRIPTION OF THE DRAWINGS

The FIGURE is a diagram for illustrating a method for heat-sealing resin films applied according to aspects of the present invention.

DETAILED DESCRIPTION OF EMBODIMENTS OF THE INVENTION

The following describes a laminated sheet for a laminated steel sheet for both-sided resin-coated container as an embodiment of the present invention in detail with reference to the accompanying drawing.

[Method for Calculating Degree of Crystallinity]

The following first describes a method for calculating the degree of crystallinity of a resin film in accordance with aspects of the present invention. In accordance with aspects of the present invention, a density d of the resin film was measured using the method of density gradient tube stipulated by JIS, and a value obtained by substituting the measured density d into the following numerical expression (1) was calculated as the degree of crystallinity of the resin film.

$$(d-1.335)/(1.501-1.335)\times 100 \quad (1)$$

[Method for Calculating Crystallization Temperature]

The following describes a method for calculating the crystallization temperature of the resin film in accordance with aspects of the present invention. In accordance with aspects of the present invention, thermal analysis (differential scanning calorimetry: DSC) was performed on the resin film in the temperature range of −50° C. to 290° C. to calculate the crystallization temperature of the resin film. In this process, the rate of temperature increase of the resin film was 10° C./minute, and the thermal analysis was performed in a nitrogen atmosphere (50 ml/minute).

[Base Metal Sheet]

For a metal sheet as a base of the laminated steel sheet for a both-sided resin-coated container according to aspects of the present invention, steel sheets widely used as materials for canning containers for food can be used. Particularly preferred is tin-free steel (hereinafter, TFS), which is a surface-treated steel sheet having a two-layer coating with metallic chromium as a lower layer and chromium hydroxide as an upper layer. The adhesion amounts of the metallic chromium and chromium hydroxide layers of TFS, which are not limited to a particular amount, are desirably in the range of 70 to 200 mg/m$^2$ for the adhesion amount of the metallic chromium layer and in the range of 10 to 30 mg/m$^2$ for the adhesion amount of the chromium hydroxide layer in view of formability and corrosion resistance.

[Resin Film on the Inner Side]

In the laminated steel sheet for a both-sided resin-coated container according to aspects of the present invention, a resin film to be heat-sealed to a face, among the two faces of the steel sheet, serving as the inner side of a canning container for food when the canning container for food is formed from the laminated steel sheet for a both-sided resin-coated container is required to have a polyethylene terephthalate content of 95% by weight or more and a degree of crystallinity in the range of 3 to 25%.

[Resin Film on the Outer Side]

In the laminated steel sheet for a both-sided resin-coated container according to aspects of the present invention, a resin film to be heat-sealed to a face, among the two faces of the steel sheet, serving as the outer side of the canning container for food when the canning container for food is formed from the laminated steel sheet for a both-sided resin-coated container contains polyethylene terephthalate and polybutylene terephthalate and has a proportion of polybutylene terephthalate in the range of 40 to 80% by weight. In addition, the crystallization temperature of the resin film is required to be in the range of 60 to 72° C.

The resin film on the outer side and the resin film on the inner side are simultaneously heat-sealed, and the resin films on the inner and outer sides are required to be controlled appropriately to the crystallized state as described above. In other words, the degree of crystallinity of the resin film on the inner side is required to be in the range of 3 to 25%. If the degree of crystallinity is less than 3%, there are many unoriented layers, and spherulites grow when being subjected to thermal hysteresis during can manufacturing and the like, whereby can formability is impaired. In contrast, if the degree of crystallinity exceeds 25%, there are many oriented layers, and can formability is impaired. The degree of crystallinity of the resin film on the inner side is more preferably in the range of 10 to 20%.

The resin film on the outer side is required to be controlled to have a crystallization temperature in the range of 60 to 72° C. If the crystallization temperature is less than 60° C., heat is required to be applied during heat sealing, which may impair formability. In contrast, if the crystallization temperature exceeds 72° C., crystallization is retarded, and whitening resistance is impaired. The crystallization temperature of the resin film on the outer side is more preferably in the range of 60 to 70° C.

The following describes a method for heat-sealing the resin films with reference to the FIGURE. When the resin films are heat-sealed, as illustrated in the FIGURE, for example, after a steel sheet 1 is heated up to a certain temperature or more by a heating apparatus 11, resin films 2 (2a and 2b) are pressure-sealed to both sides of the steel sheet 1 by pressure sealing rolls (hereinafter, denoted by lamination rolls) 12 to heat-seal the resin films 2 thereto. After the resin films 2 are heat-sealed, the steel sheet 1 is cooled by a cooling apparatus 13.

The following describes the details of heat sealing conditions for the resin films 2. The temperature of the steel sheet 1 at the start of heat sealing is desirably within the range of +5 to +40° C. based on the melting point of the resin films 2. To ensure interlayer adhesiveness between the steel sheet 1 and the resin films 2 by heat sealing, the thermal flowing of a polyester resin at contact interfaces is necessary. The temperature of the steel sheet 1 is made to be in the temperature range of +5° C. or more based on the melting point of the resin films 2, whereby resins between the layers thermally flow, and wettability at the interfaces becomes mutually favorable, thus obtaining improved adhesiveness. However, even if the temperature of the steel sheet 1 exceeds +40° C., no further effect of improving adhesiveness is expected, and the melting of the resin films 2 becomes excessive, which may cause problems such as surface roughening by embossing by the surface of the lamination rolls 12 and the transfer of a melt to the lamination rolls 12; the temperature of the steel sheet 1 at the start of heat sealing is thus preferably +40° C. or less based on the melting point of the resin films 2.

The thermal hysteresis that the resin films 2 receive during heat sealing is preferably a time of mutual contact with the steel sheet 1 of 5 msec or more at a temperature of the melting point of the resin films 2 or more. This is because wettability at the interfaces between the steel sheet 1 and the resin films 2 is favorable. While being in mutual contact with the steel sheet 1, the resin films 2 melt from the vicinity of the interfaces with the steel sheet 1 by heat. The thermal conductivity of the resin films 2 is extremely low, and the surface layers of the resin films 2 do not reach its melting point in such a short time as 5 to 40 msec, but when this time is extended, the temperature of the surfaces increases to a temperature near the melting point, which may cause the resin films 2 to melt and stick to the lamination rolls 12. Also from this viewpoint, the thermal hysteresis that the resin films 2 receive during heat sealing is preferably 40 msec or less and more preferably in the range of 10 to 25 msec.

To obtain such a heat sealing condition, cooling during heat sealing is required in addition to high-speed operation at 150 mpm or more. The lamination rolls 12 illustrated in FIG. 1 are of an internal water-cooled type, for example, and can inhibit the resin films 2 from being excessively heated by passing cooling water therewithin. Furthermore, the temperature of this cooling water is changed independently for each of the resin films 2 on the inner side and the outer side, whereby the thermal hysteresis of the resin films 2 can be controlled, which is favorable. In this case, the resin film 2 on the inner side is higher in melting temperature, and the temperature of the lamination roll 12 is preferably set to be higher, whereas the temperature of the lamination roll 12 on the outer side is preferably set to be lower. It is preferable to set the temperature of the lamination roll 12 on the inner side to 120° C. and the temperature of the lamination roll 12 on the outer side to 80° C., for example, so that there will be a temperature difference between the inner side and the outer side. The temperature of the lamination rolls 12 may be adjusted as appropriate within the range of 50 to 130° C.

The pressurization of the lamination rolls 12 is preferably in the range of 9.8 to 294 N/cm² (1 to 30 kgf/cm²) as surface pressure. If the pressurization of the lamination rolls 12 is less than 9.8 N/cm², forces that press and extend the resin films 2 across the surface of the steel sheet 1 are weak even if the temperature at the start of heat sealing is +5° C. or more with respect to the melting point of the resin films 2, which ensures sufficient flowability, and sufficient coverage cannot be obtained. Consequently, performance such as adhesiveness and corrosion resistance (contents resistance) may be influenced. If the pressurization of the lamination rolls 12 exceeds 294 N/cm², forces acting on the lamination rolls 12 are so large that the equipment needs to have strength, resulting in an uneconomical increase in the size of the equipment, although no inconvenience occurs in the performance of the laminated steel sheet. Consequently, the pressurization of the lamination rolls 12 is preferably in the range of 9.8 to 294 N/cm².

The resin film 2 on the outer side contains polyethylene terephthalate and polybutylene terephthalate in which the proportion of polybutylene terephthalate (PBT) is in the range of 40 to 80% by weight. If the proportion of PBT is less than this range, whitening unfavorably occurs during the retort sterilizing treatment. The whitening during the retort sterilizing treatment will be described below. In contrast, if the proportion of PBT exceeds this range, heating in a water vapor atmosphere unfavorably impairs adhesiveness and the like.

The composition of the resin film 2 on the inner side is 95% by weight or more of polyethylene terephthalate (PET). If the proportion of PET is less than 95% by weight, other components including a copolymerized component are mixed and are eluted into contents to impair contents resistance. Moreover, the added other components lower the melting point to impair heat sealability (adhesiveness) with the steel sheet.

A dicarboxylic acid component, a glycol component, or other resin components may be copolymerized with the materials of the resin films 2 on the inner side and the outer side (less than 5 mol % for the inner side) to the extent that formability, heat resistance, and corrosion resistance are not impaired. Examples of the dicarboxylic acid component include aromatic dicarboxylic acids such as isophthalic acid, naphthalene dicarboxylic acid, diphenyl dicarboxylic acid, diphenyl sulfone dicarboxylic acid, diphenoxyethane dicarboxylic acid, 5-sodium sulfoisophthalic acid, and phthalic acid; aliphatic dicarboxylic acids such as oxalic acid, succinic acid, adipic acid, sebacic acid, dimer acid, maleic acid, and fumaric acid; alicyclic carboxylic acids such as cyclohexane dicarboxylic acid; and oxycarboxylic acids such as p-oxybenzoic acid.

Examples of the glycol component include aliphatic glycols such as ethylene glycol or butanediol, propanediol, pentanediol, hexanediol, and neopentyl glycol; alicyclic glycols such as cyclohexane dimethanol; aromatic glycols such as bisphenol A and bisphenol S; and diethylene glycol. Two or more of the dicarboxylic acid components and the glycol components may be used in combination.

Fluorescent brightening agents, antioxidants, thermal stabilizers, ultraviolet absorbers, plasticizers, pigments, antistatic agents, crystal nucleating agents, and the like can be blended as needed. When the resin film on the outer side contains a disazo-based pigment, for example, the resin film is strong in coloring power while having improved transparency, and is rich in extensibility, and thus appearance with brilliant colors can be obtained even after can manufacturing. When a pigment is added, its content is preferably 30 PHR or less. The added amount of the pigment is a proportion (outer proportion to the resin amount) to a resin layer (to a lower resin layer when it has been added to the lower resin layer) to which the pigment has been added. As to the disazo-based pigment, at least one of the pigments the color index (C. I. the name of registration) of which is Pigment Yellow 12, 13, 14, 16, 17, 55, 81, 83, 180, and 181 can be used. In view of the sharpness of colors (brilliant colors), bleeding resistance (the ability to inhibit a phenomenon in which the pigment is precipitated on the surface of the film) in a retort sterilization treatment environment, and the like in particular, pigments having a high molecular weight and poor solubility to a PET resin are desirable; and C. I. Pigment Yellow 180, which has a benzimidazolone structure with a molecular weight of 700 or more, is more preferably used.

A resin material forming the resin films 2 is not limited by its method of manufacture. The resin material can be formed using the following methods (1) and (2), for example.

(1) A method that subjects terephthalic acid, ethylene glycol, and a copolymerized component to an esterification reaction and then subjects the obtained reaction product to polycondensation to obtain a copolymerized polyester.

(2) A method that subjects dimethyl terephthalate, ethylene glycol, and copolymerized component to an esterification reaction and then subjects the obtained reaction product to polycondensation to obtain a copolymerized polyester.

In the manufacture of the copolymerized polyester, additives such as fluorescent brightening agents, antioxidants, thermal stabilizers, ultraviolet absorbers, and antistatic agents may be added as needed.

The polyester resin used in accordance with aspects of the present invention desirably has a weight average molecular weight in the range of 5,000 to 100,000 and more preferably in the range of 10,000 to 80,000 in view of improving mechanical characteristics, laminatability, and taste characteristics. The thickness of the polyester resin according to aspects of the present invention is preferably in the range of 5 to 50 μm, further preferably 8 to 30 μm, and particularly preferably in the range of 10 to 25 μm.

[On Whitening During Retorting]

When the retort sterilization treatment is performed on a canning container for food manufactured using a steel sheet to which resin films have been heat-sealed, a phenomenon in which a resin film on the outer side whitens is observed in many cases. This is because fine air bubbles are formed within the resin film on the outer side, and light is scattered by the fine air bubbles, showing turbid appearance. In addition, the fine air bubbles formed within the resin film on the outer side have the following features. First, the fine air bubbles are not formed even when the canning container for food is heated in a dry heat environment. Second, the fine air bubbles are not formed even when the retort sterilization treatment is performed on the canning container for food remaining empty without contents. Third, the fine air bubbles are not observed across the entire area in the thickness direction of the resin film on the outer side but are observed only in the vicinity of the interface in contact with the steel sheet. It is considered, from the foregoing features that the formation of the fine air bubbles within the resin film on the outer side accompanying the retort sterilization treatment occurs by the following mechanism.

First, from the start of the retort sterilization treatment, the canning container for food is exposed to high-temperature vapor, and part of the high-temperature vapor enters the inside of the resin film on the outer side to reach the vicinity of the interface between the resin-film on the outer side and the steel sheet. At the start of the retort sterilization treatment, the vicinity of the interface between the resin film on the outer side and the steel sheet is cooled from the inner side by the contents of the canning container for food, and the high-temperature vapor that has entered the interface becomes condensed water. Next, with the passage of time of the retort sterilization treatment, the temperature of the contents of the canning container for food increases, and the condensed water at the interface is vaporized. The vaporized condensed water again escapes to the outside through the resin film; the condensed water in this process leaves the air bubbles. It is considered that the reason why the air bubbles are observed only in the vicinity of the interface between the resin film and the steel sheet is because the place at which the condensed water is formed is the vicinity of the interface between the resin film and the steel sheet. In addition, it is considered that this is because the resin film near the interface with the steel sheet that has melted through contact with the heated steel sheet is an amorphous resin that is mechanically soft and is rich in deformability even after being cooled and solidified and is thus likely to become deformed and to form the air bubbles. Consequently, an effective way to prevent the air bubbles from being formed within the resin film on the outer side and to inhibit whitening during the retort sterilization treatment is, for the resin film on the outer side, to quickly crystalize the amorphous polyester layer by the heat of the retort sterilization treatment to increase the strength of the amorphous resin.

As described above, in the laminated steel sheet for a both-sided resin-coated container according to aspects of the present invention, the resin film positioned on the outer side of the container has the improved visual quality of appearance after the retort sterilization treatment on the steel sheet, whereas the resin film positioned on the inner side of the container has improved contents resistance and can thus maintain adhesiveness even when the retort sterilization treatment is performed in contact with contents.

The following describes examples of the present invention.

Examples

In the present examples, first, a steel sheet with a thickness of 0.18 mm and a width of 977 mm on which cold rolling, annealing, and temper rolling had been performed was degreased, pickled, and subjected to chromium plating treatment to manufacture a chromium-plated steel sheet (TFS). In the chromium plating treatment, chromium plating was performed in a chromium plating bath containing $CrO_3$, $F^-$, and $SO_4^{2-}$, intermediate rinsing was performed, and then electrolysis treatment was performed on the steel sheet with a chemical conversion treatment solution containing $CrO_3$ and F. In this process, electrolysis conditions (current density, the quantity of electricity, and the like) were adjusted to give a metallic chromium adhesion amount and a chromium hydroxide adhesion amount of 120 $mg/m^2$ and 15 $mg/m^2$, respectively, in terms of chromium.

Next, the chromium-plated steel sheet was heated by a metal strip heating apparatus using a lamination apparatus, and resin films were heat-sealed to both sides of the chromium-plated steel sheet by lamination rolls to manufacture a laminated steel sheet for a both-sided resin-coated container. The lamination rolls were of an internal water-cooled type, and cooling water was forcedly circulated during heat sealing to cool the steel sheet while the resin films were heat-sealed. The characteristics of the laminated steel sheet for a both-sided resin-coated container manufactured by the foregoing method were measured and evaluated by the following methods (1) to (5). Table 1 below lists the characteristics of the heat-sealed resin films and evaluation results of the characteristics of the laminated steel sheet for a both-sided resin-coated container.

(1) Retort Whitening Resistance

The retort whitening resistance of the resin film on the outer side was evaluated. Specifically, a canning container for food was filled with ambient-temperature tap water, and a lid was seamed to hermetically seal the container. Subsequently, the canning container for food was placed in a steam retort sterilizing furnace with the bottom directed downward, and retort sterilization treatment was performed thereon at 125° C. for 30 minutes. After the retort sterilization treatment, an appearance change of the outer side of the bottom of the canning container for food was visually observed to evaluate the retort whitening resistance in accordance with the following grades.

(Grades)
  A: No change in appearance
  B: The occurrence of faint cloudiness in appearance (less than 5% of the film surface area)
  C: The occurrence of faint cloudiness in appearance (5% or more and less than 10% of the film surface area)
  D: Turbidity in appearance (the occurrence of whitening in 10% or more of the film surface area)

(2) Adhesiveness (Wet Adhesiveness)

A flat sheet sample (width: 15 mm, length: 120 mm) of the laminated steel sheet for a both-sided resin-coated container before can manufacturing was cut out, and part of the resin film was peeled off from a long-side end of the cut-out sample. The peeled-off resin film was opened in a direction opposite (angle: 180 degrees) to the peeled direction, a weight of 50 g was fixed thereto, and retort sterilization treatment (125° C., 30 minutes) was performed. A peeled length of the resin film after the retort sterilization treatment was measured to evaluate pre-forming film wet adhesiveness (secondary adhesiveness) as the adhesiveness of the resin film in accordance with the following grades.

(Grades)
  A: Less than 10 mm
  B: 10 mm or more and less than 20 mm
  C: 20 mm or more (3) Can Formability Wax was applied to the laminated steel sheet for a both-sided resin-coated container, and a disc with a diameter of 200 mm was punched to obtain a shallow-drawn can with a drawing ratio of 2.00. Subsequently, the shallow-drawn can was redrawn with a drawing ratio of 2.50, was subjected to doming in accordance with a usual method, was trimmed, and was necked-in and flanged to form a deep-drawn can. Focusing on the necked-in part of the thus obtained deep-drawn can, the extent of damage of the resin film was visually observed. The inner and outer sides of the deep-drawn can were evaluated.

(Grades)
  A: No damage observed on the resin film after forming
  B: Slight damage observed on the resin film after forming
  C: Impossible forming due to the breakage of the deep-drawn can (4) Contents Resistance (the Coverage of the Resin Film on the Inner Side)

Lid seaming was performed on a welded can barrel similarly to (1) to manufacture a canning container for food (internal capacity: 180 ml). Subsequently, the canning container for food was filled with tap water, a lid was seamed to a can upper part to hermetically seal the container, and retort sterilization treatment (125° C., 30 minutes) was performed. After the can body became room temperature after the retort sterilization treatment, the lid at the upper part of the canning container for food was opened, 50 ml of an electrolyte solution (a 1% NaCl solution) was poured into the can body, and a voltage of 6 V was applied to between the can body and the electrolyte solution. A current value measured in this process was evaluated. The coverage of the resin film on the lid inner side was evaluated as contents resistance in accordance with the following grades.
(Grades)
A: 0.01 mA or less
B: Exceeding 0.01 mA and 0.1 mA or less
C: Exceeding 0.1 mA and 1 mA or less
D: Exceeding 1 mA
(5) Formability A laminated steel sheet for a both-sided resin-coated container was manufactured as described above, and the presence or absence of the adhesion of the resin films to the lamination rolls and the like was observed to evaluate formability in accordance with the following grades.
(Grades)
A: The absence of film adhesion
B: The presence of film adhesion has been described, the present invention is not limited by the description and the drawing forming part of the disclosure of the present invention by the present embodiment. In other words, other embodiments, examples, operational techniques, and the like made by those skilled in the art and the like based on the present embodiment are all included in the scope of the present invention.

INDUSTRIAL APPLICABILITY

The present invention can provide a laminated steel sheet for a both-sided resin-coated container capable of being supplied stably without any problem in manufacture, has an improved visual quality of appearance after retort sterilization treatment and improved contents resistance.

REFERENCE SIGNS LIST

1 Steel sheet
2a, 2b Resin film
11 Heating apparatus
12 Pressure sealing roll (lamination roll)
13 Cooling apparatus

TABLE 1

|  | Resin film | | | | Retort | | | Contents | |
|  | Outer side | | | Inner side | whitening | | | resistance | |
|  | PET (wt %) | PBT (wt %) | Crystallization temperature (° C.) | PET (wt %) | Degree of crystallinity | resistance (outer side) | Adhesiveness (inner side) | Can formability | (inner side) | Formability |
| Inventive Example 1 | 40 | 60 | 70 | 96 | 16 | A | A | A | A | A |
| Inventive Example 2 | 38 | 62 | 64 | 95 | 17 | A | A | A | A | A |
| Inventive Example 3 | 41 | 59 | 50 | 95 | 14 | A | A | A | A | A |
| Inventive Example 4 | 43 | 57 | 69 | 95 | 22 | A | A | B | A | A |
| Inventive Example 5 | 40 | 60 | 63 | 100 | 13 | A | A | A | A | A |
| Inventive Example 6 | 36 | 64 | 64 | 95 | 5 | A | A | B | A | A |
| Inventive Example 7 | 43 | 57 | 68 | 97 | 11 | A | A | A | A | A |
| Inventive Example 8 | 36 | 64 | 61 | 95 | 13 | A | A | A | A | A |
| Inventive Example 9 | 36 | 64 | 60 | 95 | 18 | A | A | A | A | A |
| Inventive Example 10 | 40 | 62 | 70 | 100 | 17 | A | A | A | A | A |
| Inventive Example 11 | 40 | 60 | 66 | 100 | 10 | A | A | A | A | A |
| Inventive Example 12 | 36 | 64 | 66 | 95 | 19 | A | A | A | A | A |
| Inventive Example 13 | 36 | 64 | 60 | 100 | 17 | A | A | A | A | A |
| Inventive Example 14 | 36 | 64 | 67 | 98 | 25 | A | A | B | A | A |
| Inventive Example 15 | 37 | 63 | 72 | 95 | 14 | A | A | A | A | A |
| Inventive Example 16 | 41 | 59 | 66 | 100 | 14 | A | A | A | A | A |
| Inventive Example 17 | 38 | 62 | 70 | 95 | 20 | A | A | B | A | A |
| Inventive Example 18 | 36 | 64 | 65 | 95 | 12 | A | A | A | A | A |
| Inventive Example 19 | 30 | 61 | 68 | 100 | 16 | A | A | A | A | A |
| Inventive Example 20 | 50 | 50 | 45 | 95 | 18 | A | A | B | A | A |
| Inventive Example 21 | 50 | 50 | 75 | 95 | 16 | B | A | B | A | A |
| Comparative Example 1 | 70 | 30 | 66 | 95 | 11 | D | A | B | A | A |
| Comparative Example 2 | 10 | 90 | 60 | 95 | 13 | D | A | B | A | A |
| Comparative Example 3 | 50 | 50 | 62 | 90 | 10 | A | A | B | D | A |
| Comparative Example 4 | 50 | 50 | 63 | 95 | 2 | A | A | B | D | B |
| Comparative Example 5 | 50 | 50 | 64 | 95 | 30 | A | A | C | — | A |

As listed in Table 1, it has been revealed from Inventive Examples 1 to 21 that a laminated steel sheet for a both-sided resin-coated container that has improved favorable retort whitening resistance, adhesiveness, can formability, contents resistance, and formability can be obtained. It has been revealed from Comparative Examples 1 and 2 that when the PBT proportion of the resin film on the outer side is out of the range of the present invention, the laminated steel sheet for a both-sided resin-coated container is inferior in retort whitening resistance.

Although an embodiment to which aspects of the invention made by the inventors of the present invention is applied

The invention claimed is:
1. A laminated steel sheet for a both-sided resin-coated container, comprising:
a steel sheet;
a first polyester resin layer formed on a surface of the steel sheet serving as an inner side of a container after the container is formed; and
a second polyester resin layer formed on a surface of the steel sheet serving as an outer side of the container after the container is formed,
wherein the first polyester resin layer includes a polyethylene terephthalate content of 100% by weight with no copolymerized component and has a degree of crystallinity in a range of 10% to 25%, and the second polyester resin layer includes polyethylene terephthalate and polybutylene terephthalate and has a proportion of polybutylene terephthalate in a range of 40% by weight to 80% by weight.

2. The laminated steel sheet for a both-sided resin-coated container according to claim 1, wherein a crystallization temperature of the second polyester resin layer is in a range of 60° C. to 72° C.

\* \* \* \* \*